April 1, 1969  N. C. SHER  3,435,837
CONTROL APPARATUS
Filed Nov. 8, 1965
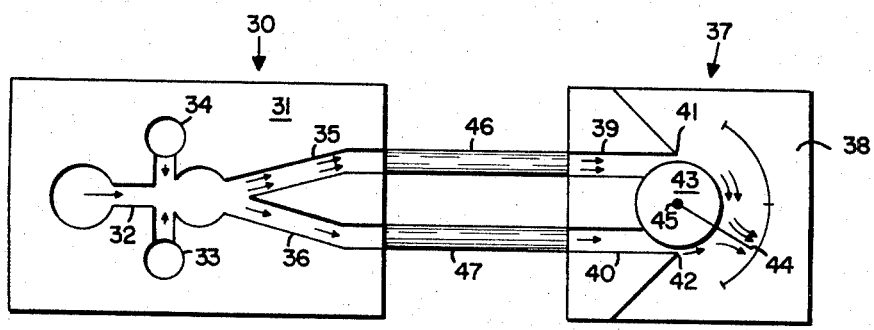
FIG. 3
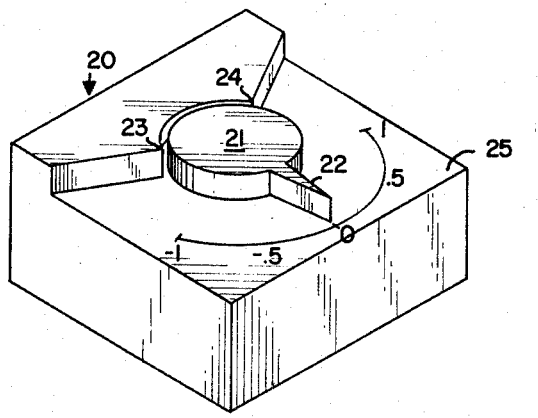
FIG. 2
FIG. 1
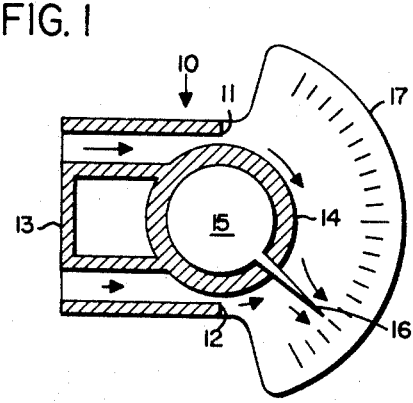
INVENTOR.
NEIL C. SHER
BY
ATTORNEY United States Patent Office 3,435,837
Patented Apr. 1, 1969

3,435,837
CONTROL APPARATUS
Neil C. Sher, St. Paul, Minn., assignor to Honeywell Inc., Minneapolis, Minn., a corporation of Delaware
Filed Nov. 8, 1965, Ser. No. 506,793
Int. Cl. F15c 1/08, 1/12, 1/14
U.S. Cl. 137—81.5                    5 Claims

ABSTRACT OF THE DISCLOSURE

An indicating device employing the principle of fluid attachment to provide a visual indication of the relative strengths of two fluid streams.

---

This invention pertains generally to a display device, and more particularly to display or indicating means for fluid amplifiers.

The discovery of fluid amplifiers has led to much activity and demand for fluid devices to perform monitoring, metering, control, and sensing functions. These functions have conventionally been accomplished with various devices that employ moving parts or electrical components. However, with the advent of the new fluid amplifier technology, much effort has been expended to replace conventional devices with fluid amplifier devices.

With conventional electrical components, there are metering devices such as voltmeters and ammeters. Generally, these prior art devices give proportional indications of variable quantities. For example, a voltmeter is conventionally used to measure the voltage between two conductors. There is in fluid technology a corresponding need for devices to indicate the relative strengths of two streams of fluid. There are prior art devices to determine the relative strengths of two fluid streams, by measurement of the pressure of the fluid stream with a manometer or by comparing the fluid flow rates of the streams. However, these devices are bulky and generally do not lend themselves readily to monitoring outputs of fluid amplifiers.

The applicant has invented a device for determining the relative strengths of two fluid streams. The applicant's invention uses only a single moving part to obtain an indication of the relative strength of two fluid streams.

It will also be apparent that the applicant's device can be used as a display for indicating the relative outputs of a fluid proportional amplifier, as well as for a differential indicator of the strengths of two fluid streams similar to the conventional gages. For example, the applicant's device may be used as an indicator for a speed sensor, rate sensor, etc.

Other uses of the applicant's device will become apparent as the description proceeds and in the drawings, in which:

FIGURE 1 is a cross-sectional view of one embodiment of the applicant's display device;

FIGURE 2 is a pictorial view of another embodiment of the applicant's display device; and FIGURE 3 shows schematically another embodiment of the applicant's display device connected to a fluid amplifier.

Referring now to FIGURE 1, reference numeral 10 generally identifies the applicant's display device. A first nozzle 11 and a second nozzle 12 for supplying fluid are located in a housing 13. The housing includes a convex surface of revolution 14, which projects between nozzles 11 and 12. Fluid streams from the nozzles flow in opposite directions around surface 14 to collide at some location therearound, where they detach from the surface and diverge outwardly. An indicating device 15, responsive to fluid signals is shown as journaled in housing 13:

a pointer or index 16 on device 15 extends into the path of flow along surface 14. A graduated scale 17 is provided on housing 13 for cooperation with pointer 16. Device 15 may be supported in housing 13 hydrostatically, or by any other means which allows indicator 15 to rotate within housing 13.

In FIGURE 2, a housing 20 is shown to movably support an indicator 21 including a pointer or index 22 extending from an otherwise cylindrical lateral surface. Housing 20 includes a pair of nozzles 23 and 24 supplying fluid streams which pass around the cylindrical surface of indicator 21 in opposite directions, as described in connection with FIGURE 1. Housing 20 includes a readout face 25 graduated for cooperation with index 22.

Referring to FIGURE 3, reference numeral 30 denotes a housing for a fluid amplifier 31, having a power supply nozzle 32, control ports 33 and 34, and receiver legs 35 and 36.

A different embodiment of the applicant's display device is denoted by reference numeral 37. A housing 38 is provided with a first fluid supply channel 39 and a second fluid supply channel 40. A first fluid nozzle 41 is connected to channel 39; similarly, a second fluid nozzle 42 is connected to channel 40. A cylindrical stationary housing 43 is located between the nozzles 42 and 41. Housing 43, in contrast to indicator 21, does not rotate. Instead, a pointer 44 is attached to housing 43 by a pivot 45. It should be pointed out that housing 43 need not be cylindrical but may be of any other continuous shape.

The channels 39 and 40 of applicant's display device are connected by conduits 46 and 47 to output legs 35 and 36 respectively of amplifier 30.

Referring to FIGURE 1, the applicant's display device will be described in its normal mode of operation.

In normal operation, a fluid stream emerges from nozzle 11 and accelerates some of the quiescent fluid around it up to the fluid velocity of the stream. When a portion of the fluid is accelerated in such a manner, the pressure is lowered adjacent to the fluid stream. Since there is a limited amount of fluid to be drawn from the area bounded by the jet from nozzle 11 and the surface 14, the pressure is lowered adjacent to the surface 14. Consequently, the fluid stream emergizing from power nozzle 11 wraps around or follows the surface 14.

The same phenomenon occurs with the fluid stream emerging from fluid nozzle 12. The result is that the fluid streams on both sides of the surface 14 adhere to the surface and meet at some point on the surface. When the two fluid streams meet, they diverge outwardly from the surface 14.

The point along surface 14 at which the fluid streams diverge from the surface is dependent upon the relative strengths of the two fluid streams emerging from power nozzles 11 and 12. If the two streams are equal, the fluid stream will diverge at a point equidistant from the power nozzles 11 and 12. If a stronger fluid signal emerges from power nozzle 11 than from nozzle 12 the fluid stream diverges from surface of revolution 14 at a point near nozzle 12. Pointer 16 is in the path of fluid attached to surface 14 so that the angle at which the two fluid streams diverge from the surface of revolution can be readily observed visually with reference to scale 17. It can thus be appreciated that the applicant's device will indicate the differential strength of the two fluid streams emerging from nozzles 11 and 12.

Referring to FIGURE 2, fluid normally emerges from the first nozzle 23 and the second nozzle 24. As the fluid emerges from the nozzles, there is an entrainment of quiescent fluid by the streams, which results in the fluid streams adhering to the rotatably journaled indicator 21. The fluid streams flow around opposite sides of indicator 21 and diverge along the pointer 22. Consequently, the position taken by the pointer 22 is governed by the strengths of the two fluid streams emerging from the power nozzles.

Referring now to FIGURE 3, fluid amplifier 31 is a well-known momentum type of amplifier, that employs side jets to deflect a fluid stream flowing therebetween. That is, in normal operation, a fluid stream flows from power nozzle 32 into receiver legs 35 and 36. By applying control flow in control ports 33 and 34, the fluid stream emerging from power nozzle 32 can be deflected in a greater or lesser portion into a particular receiver leg. For example, with fluid flowing in nozzle 32 and a stronger signal on control port 33 than in control port 34, the main portion of the fluid stream will flow into receiver leg 35. The amount of fluid flowing into the receiver legs is primarily governed by the control momentum of the side jets.

In normal operation, fluid flows from output legs 35 and 36 through conduits 46 and 47 and into channels 39 and 40 respectively and around cylindrical housing 43. As a result, the two fluid streams collide and termination from housing 43 in the form of single fluid stream. The single fluid stream flows in a radial location from the housing. However, the direction at which the fluid stream detaches from the cylindrical housing 43 is dependent upon the relative strength of the two fluid streams. If the two fluid streams are equal, the pointer 44 bisects the angle between the two fluid nozzles. If the strength of the fluid stream in nozzle 41 is greater than that of the fluid stream in nozzle 42, for example, the pointer rotates clockwise away from the nozzle 42 indicating that more fluid is flowing through nozzle 41. Thus, the display device 37 indicates the location at which the fluid stream detaches from the surface of the housing, which is in turn indicative of the relation between the strengths of the streams from the two nozzles.

The present invention can be altered in many ways by one skilled in the art once the display techniques have been disclosed. The applicant, therefore, wishes not to be limited in the scope of his invention by the specific disclosure shown but only by the appended claims.

I claim:
1. An indicating unit comprising in combination: a member having a convex surface; first nozzle means directing a first continuous stream of fluid along said surface, for attachment thereto and subsequent flow therearound in a first direction; second nozzle means, remote from said first nozzle means, directing a second continuous stream of fluid along said surface, for attachment thereto and subsequent flow therearound in such a direction as to collide with the fluid of said first stream at a location, with respect to said surface, determined by the relative strengths of said streams, whereupon all of the fluid detaches from said surface at said location in a common stream; and an index carried by said member and freely movable in alignment with said surface so as to be brought to and maintained in a position coordinated with said location by said streams.

2. Apparatus according to claim 1 together with a graduated scale mounted for cooperation with said index member.

3. Apparatus according to claim 1 together with means for varying the relative strengths of said streams.

4. Apparatus according to claim 1 in which said member is rotatable about an axis, said surface is a surface of revolution about said axis, and said index is integral with said member for rotation therewith.

5. Apparatus according to claim 1 in which said member is fixed with respect to said nozzles and said index is rotatably carried by said member in the path of said streams.

References Cited

UNITED STATES PATENTS

| | | | |
|---|---|---|---|
| 2,350,066 | 5/1944 | Parker | 92—121 XR |
| 2,655,903 | 10/1953 | Tyler | 91—1 |
| 2,988,057 | 6/1961 | Litz | 92—121 XR |
| 3,063,422 | 11/1962 | Gregowski et al. | 92—121 XR |
| 3,202,179 | 8/1965 | Vockroth | 137—81.5 XR |
| 3,285,263 | 11/1966 | Bjornsen et al. | 137—81.5 |
| 3,319,656 | 5/1967 | Reader | 137—81.5 |
| 3,339,571 | 9/1967 | Hatch | 137—81.5 |
| 3,340,896 | 9/1967 | Mon et al. | 137—81.5 XR |
| 3,342,198 | 9/1967 | Groeber | 137—81.5 |

SAMUEL SCOTT, *Primary Examiner.*